United States Patent [19]

Nakamura et al.

[11] Patent Number: 5,835,181
[45] Date of Patent: Nov. 10, 1998

[54] PROCESS FOR PRODUCING LIQUID CRYSTAL INCLUDING DISCHARGING LIQUID CRYSTAL MATERIAL THROUGH SECOND APERTURE

[75] Inventors: Katsutoshi Nakamura, Hiratsuka; Makoto Kojima; Masaki Sunaga, both of Atsugi, all of Japan

[73] Assignee: Canon Kabushiki Kaisha, Tokyo, Japan

[21] Appl. No.: 770,266

[22] Filed: Dec. 20, 1996

[30] Foreign Application Priority Data

Dec. 27, 1995 [JP] Japan .................................... 7-351298
Dec. 27, 1995 [JP] Japan .................................... 7-351299

[51] Int. Cl.$^6$ ........................ G02F 1/1341; G02F 1/1339; G02F 1/13
[52] U.S. Cl. ......................... 349/189; 349/154; 349/188
[58] Field of Search .................................... 349/188, 189, 349/154

[56] References Cited

U.S. PATENT DOCUMENTS

| Re. 34,690 | 8/1994 | Carrington | 349/154 |
|---|---|---|---|
| 3,701,368 | 10/1972 | Stern | 349/189 |
| 5,082,587 | 1/1992 | Janulis | 252/299.01 |

FOREIGN PATENT DOCUMENTS

| 0343902 | 11/1989 | European Pat. Off. . | |
| 0534590 | 3/1993 | European Pat. Off. . | |
| 59-131914 | 7/1984 | Japan . | |
| 60-66234 | 4/1985 | Japan | 349/153 |
| 61-132928 | 6/1986 | Japan . | |
| 64-63924 | 3/1989 | Japan | 349/154 |
| 2142753 | 5/1990 | Japan . | |
| 6-082737 | 3/1994 | Japan . | |
| 22396 | 11/1993 | WIPO . | |

Primary Examiner—Anita Pellman Gross
Attorney, Agent, or Firm—Fitzpatrick, Cella, Harper & Scinto

[57] ABSTRACT

A liquid crystal device is produced through the steps of: a) disposing a pair of substrates opposite to each other so as to form a cell between the substrates while leaving a first aperture and a second aperture for communication with an exterior and forming an effective optical modulation region between the first and second apertures, b) heating a liquid crystal material for filling the cell, and c) filling the cell with the liquid crystal material by injecting the liquid crystal material through the first aperture under a pressure difference held between the first and second apertures and, after a prescribed period, allowing the liquid crystal material to be discharged out of the second aperture. In the step c), the first aperture, the second aperture and the effective optical modulation region of the cell may preferably receive external pressures P1, P2 and P3, respectively, satisfying P1>P2 and $-1 \text{ kg.f/cm}^2 \leq P1-P3 \leq 0.5 \text{ kg.f/cm}^2$.

13 Claims, 7 Drawing Sheets

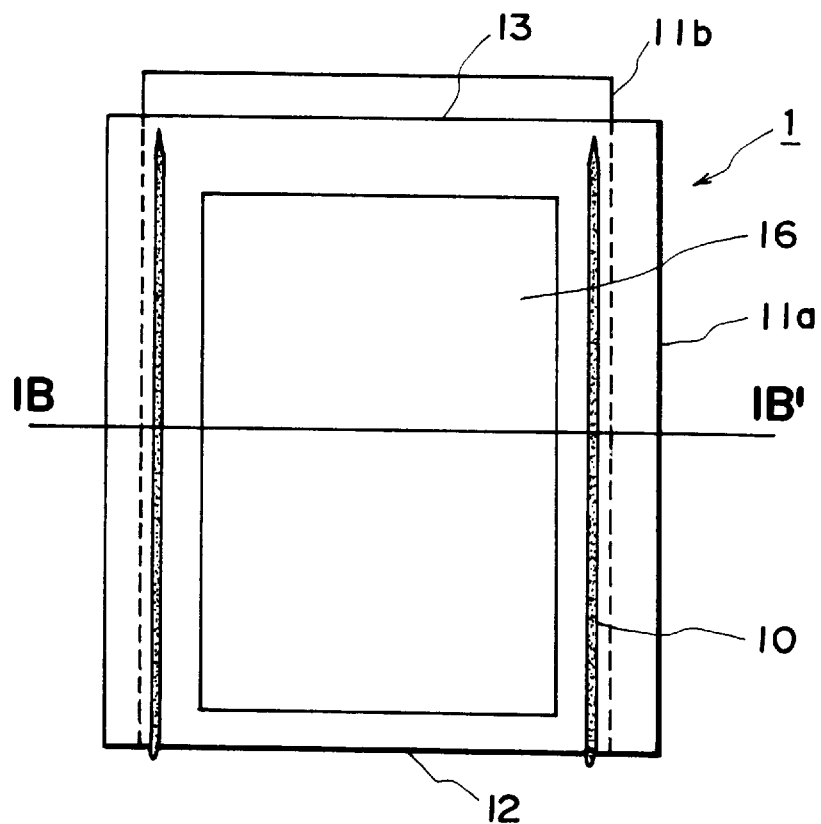
FIG. IA
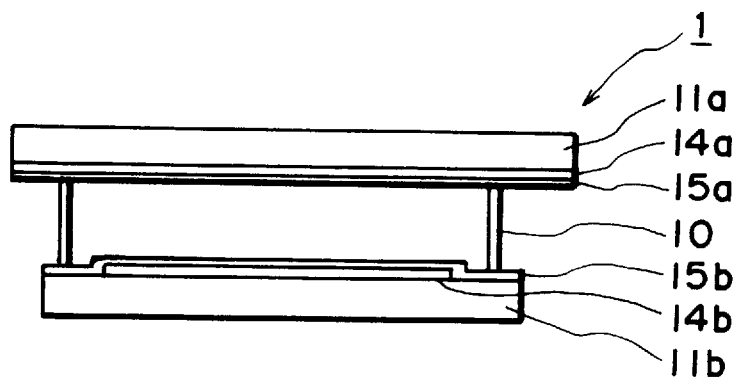
FIG. IB

PROCESS FOR PRODUCING LIQUID CRYSTAL INCLUDING DISCHARGING LIQUID CRYSTAL MATERIAL THROUGH SECOND APERTURE

FIELD OF THE INVENTION AND RELATED ART

The present invention relates to a process for producing liquid crystal devices used for constituting computer terminal displays, various flat panel displays, etc., particularly a liquid crystal injection technique used in production of such liquid crystal devices.

In production of liquid crystal devices, as a method of filling a blank cell or a panel (more specifically, a region disposed between a pair of substrates applied to each other with a prescribed pattern of sealing agent and surrounded by the sealing agent) with a liquid crystal material, there has been frequently used a so-called vacuum injection process, wherein a blank cell retaining an injection port is evacuated under vacuum and is dipped in a liquid crystal material reservoir, followed by removal of the vacuum and application of an atmospheric pressure to the liquid crystal material to inject the liquid crystal material into the cell.

In addition to the above-mentioned vacuum injection process, there have been also known an injection process using a capillary phenomenon (Japanese Laid-Open Patent Application (JP-A) 61-132928), and an injection process using an elevated pressure (JP-A 6-82737).

However, the above-mentioned vacuum injection process is sometimes accompanied with a problem that the liquid crystal material exposed to the vacuum is liable to be evaporated and denaturated thereby. This is particularly problematic in the case of using a liquid crystal material having a high vapor pressure or a liquid crystal material containing a component having ga high vapor pressure, such as a fluorine-containing compound. The vacuum injection process is further accompanied with a problem that impurities, such as moisture and fine dirt, remaining in a cell prior to the liquid crystal injection are pushed toward an inner sealing wall side region opposite to the injection port, and the liquid crystal in the region is caused to have different display characteristics from those at the other region. Further, as the process includes a pressure reduction step for realizing a vacuum in the cell, the liquid crystal injection requires a long time.

The above-mentioned injection process utilizing a capillary phenomenon requires no pressure reduction step but still requires a long liquid crystal injection time.

Further, in the above-mentioned injection process utilizing an elevated pressure, a blank cell is dipped in a liquid crystal reservoir at its injection port, and the liquid crystal material is pressurized into the cell. As a result, a central region of the cell, i.e., an effective optical modulation region in the resultant liquid crystal device, is liable to have an inner pressure larger than the cell peripheral region to be excessively charged with the liquid crystal, thus being liable to have a cell gap irregularity.

SUMMARY OF THE INVENTION

In view of the above-mentioned problems, a principal object of the present invention is to provide a process for producing a liquid crystal device capable of preventing evaporation causing denaturation of liquid crystal material at the time of liquid crystal injection and localized inclusion of impurities in the liquid crystal material in the cell so as to prevent deterioration of display characteristics, and capable of liquid crystal injection in a short time without causing a cell gap irregularity.

A further object of the present invention is to provide a liquid crystal device free from deterioration in display quality.

According to the present invention, there is provided a process for producing a liquid crystal device, comprising the steps of:

a) disposing a pair of substrates opposite to each other so as to form a cell between the substrates while leaving a first aperture and a second aperture for communication with an exterior and forming an effective optical modulation region between the first and second apertures, b) heating a liquid crystal material for filling the cell, and c) filling the cell with the liquid crystal material by injecting the liquid crystal material through the first aperture under a pressure difference held between the first and second apertures and, after a prescribed period, allowing the liquid crystal material to be discharged out of the second aperture.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1A is a plan view of a liquid crystal cell structure prepared according to a process of the invention, and FIG. 1B is a sectional view taken along line 1B–1B' in FIG. 1A.

DESCRIPTION OF THE PREFERRED EMBODIMENTS

Figure 2:
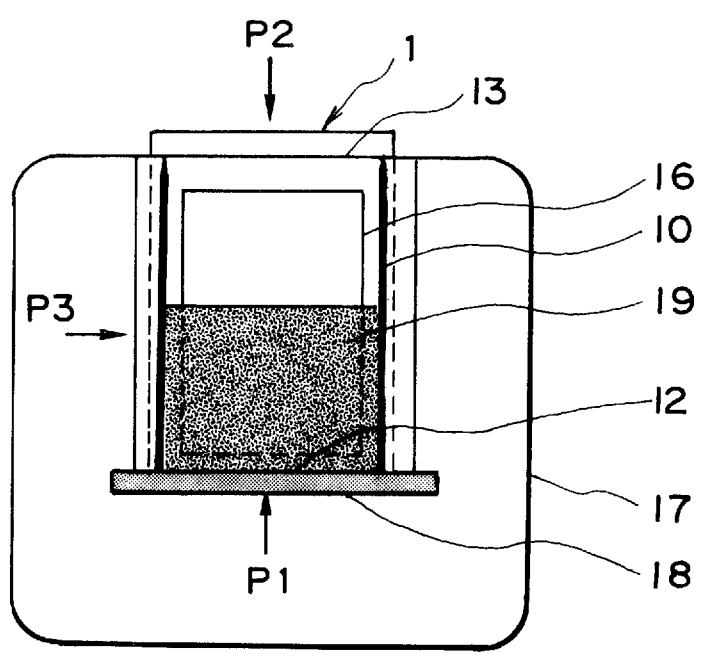
FIG. 2 is a schematic illustration of a liquid crystal filling step in the invention.

In the liquid crystal device production process according to the present invention, a cell (blank cell) prepared by disposing a pair of substrates opposite to each other while leaving a first aperture and a second aperture for communication with an exterior or an environment, and injecting a heated liquid crystal material into the cell through the first aperture as an injection port under a pressure difference held between the first and second apertures and allowing the liquid crystal material having passed through the cell to be discharged out of the second aperture for a prescribed period, before completing the liquid crystal filling.

Hereinbelow, some embodiments of the liquid crystal device production process will be described with reference to drawings.

First of all, a liquid crystal cell 1 (blank cell) is provided so as to have a structure as shown in FIG. 1A (plan view) and FIG. 1B (sectional view taken along line 1B–1B' line in FIG. 1A). More specifically, a pair of substrates 11a and 11b already provided with patterns of electrodes are applied to each other with a pattern 10 of sealing agent applied onto at least one of and disposed between the substrates 11a and 11b while leaving a first aperture (region) 12 and a second aperture (region) 13 functioning as an injection port and an effluent (or discharge) port, respectively, during the liquid crystal injection step as regions of absence of the sealing agent pattern 10. Incidentally, with an entire cell region defined between the substrates 11a and 11b and surround by the sealing agent pattern 10, a central region 16 except for a peripheral region functions as an effective optical modulation region (a display region in a display device) due to the drive of a liquid crystal confined in the cell. The substrates 11a and 11b have been provided with patterns of electrodes 14a and 14b for applying an electric field for driving to the liquid crystal and optionally films 15a and 15b for controlling the alignment state of the liquid crystal filling the cell (FIG. 1B).

Then, by using a system as shown in FIG. 2 (schematic sectional view in elevation), the above-prepared blank cell 1 is filled with a liquid crystal material. More specifically, a most part of the cell 1 including the first aperture region 12 and the effective optical modulation region 16 is inserted within ia pressurization vessel 17 while leaving at least the second aperture region 13 outside the pressurization vessel 17. In this state, the first aperture region 12 is dipped in a liquid crystal material 19 heated in advance on a liquid crystal tray 18, and the interior of the pressurization vessel 17 is pressurized. As a result, a pressure difference (P1–P2>0) is developed between a pressure P1 (within the vessel 17) exerted onto the first aperture 12 (functioning as an injection port) and a pressure P2 exerted onto the second aperture 13 (functioning as an effluent port), whereby the liquid crystal material is injected into the cell due to the pressure difference at a higher velocity than the capillary force (FIG. 2 illustrates a state where the cell 1 is half filled with the liquid crystal material). The pressures P1 and P2 are maintained even after the cell 1 is filled with the liquid crystal material 19, whereby an excess of the liquid crystal material is discharged out of the second aperture 12 (effluent port). After this operation is continued for a while, the injection port 12 and the effluent port 13 are sealed. Thus, the filling of the cell with the liquid crystal material is completed.

The above-mentioned liquid crystal injection process according to the present invention has the following advantages.

(1) As the liquid crystal injection into the cell and the effluence of the liquid crystal out of the cell are continued for a prescribed period, even when some impurities remain within the blank cell, a portion of the liquid crystal contaminated with the impurities is discharged out of the cell, thus obviating a deterioration in display quality due to contamination of the liquid crystal.

(2) As the liquid crystal material is injected after it is heated to assume a lower viscosity, even a liquid crystal material having a high viscosity, such as a smectic liquid crystal, can be injected in a short time. Further, even if the liquid crystal material is heated into a liquid phase (isotropic phase) most liable to cause evaporation, the liquid crystal material is little liable to cause evaporation as the liquid crystal material is not exposed to vacuum. Accordingly, even a liquid crystal material containing a component having a high vapor pressure, such as those having a high fluorine content, can obviate a denaturation due to preferential evaporation of such a vaporizable component.

(3) The evacuation of a cell into vacuum is not required but a pressure difference between the injection port and the effluent port is utilized, so that the time for the injection step can be reduced and the injection speed can be controlled at a larger degree.

As described above, the process according to the present invention is particularly advantageous in the case of injecting a liquid crystal material having an ordinarily high viscosity, such as a liquid crystal composition having a smectic phase or a latent smectic phase, more particularly a liquid crystal composition having a chiral smectic liquid crystal phase.

The process of the present invention is suitable in the case of using a liquid crystal material having a relatively high vapor pressure, such as one having a relatively high fluorine content. Specific examples of such a liquid crystal material having a high vapor pressure most suitably used in the present invention may include liquid crystal compositions containing at least one species of fluorine-containing mesomorphic compound which has a structure including a fluorocarbon terminal portion and a hydrocarbon terminal portion connected by a central core and has a smectic phase or a latent smectic phase. The term "latent smectic phase" refers to a property of a compound concerned that the compound alone does not exhibit smectic phase but can be a component compatibly contained in smectic phase of a liquid crystal composition.

The central core may include at least two rings selected from aromatic rings, aliphatic rings, substituted aromatic rings and substituted or unsubstituted heterocyclic aromatic rings. These rings can be mutually connected with a functional group selected from —COO—, —COS—, —HC=N— and —COSe—. These rings can be condensed or not condensed. The heterocyclic aromatic ring includes at least one non-carbon atom selected from N, O and S. One or more (non-neighboring) methylene groups in the aliphatic cyclic ring can be replaced with —O—.

Examples of such fluorine-containing mesomorphic compounds are disclosed in JP-A 2-142753, U.S. Pat. No. 5,082,587, PCT International Publication WO93/22396, Japanese Laid-Open Patent Application (TOKUHYO) 7-506368, etc.

In the process according to the present invention, such a liquid crystal material may preferably be heated to a temperature higher than an operation temperature of the resultant liquid crystal device so as to provide a viscosity of at most 100 centi-poises, preferably a temperature providing a liquid phase (isotropic phase), where the liquid crystal material is injected into the blank cell in the above-described manner.

Figures 3A, 3B, 3C:
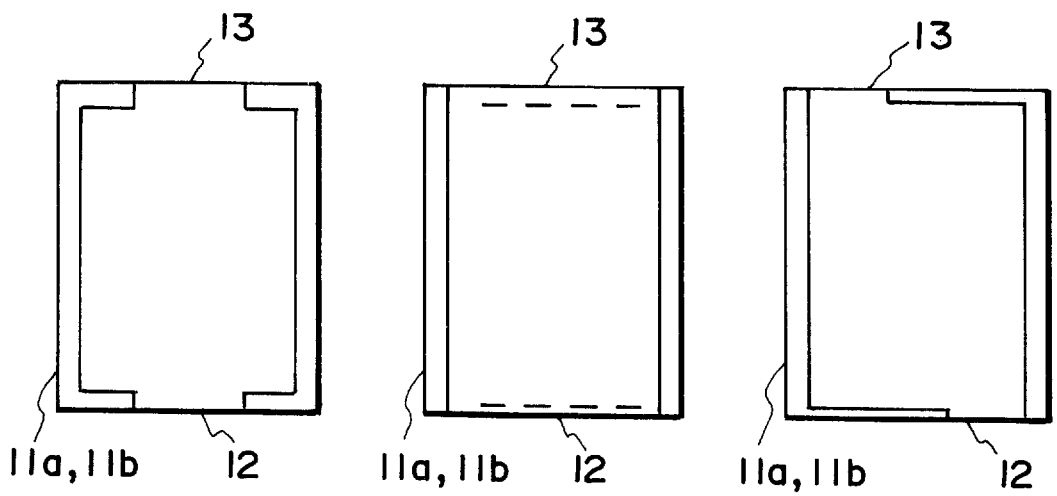
FIGS. 3A–3C are plan views each showing a sealing agent application or disposition pattern in the invention.

The shapes of the first aperture 12 (injection port) and the second aperture 13 (effluent port) in the blank cell as shown in FIG. 1 can be modified in various manners, e.g., as shown in any of FIGS. 3A–3C by changing the application pattern of the sealing agent. The shapes may be appropriately set while taking factors, such as the viscosity of the liquid crystal material, the cell size and the pressure conditions for liquid crystal filling.

In the liquid crystal filling step, it is essential to provide a pressure difference between the first aperture 12 (injection port) and the second aperture 13 (effluent port). The liquid crystal injection under such a condition may be effected in a manner as shown in FIG. 2 as described above or also in a manner as shown in FIG. 4 (wherein like members are denoted by like reference numerals as shown in FIGS. 1 and 2).

Figure 4:
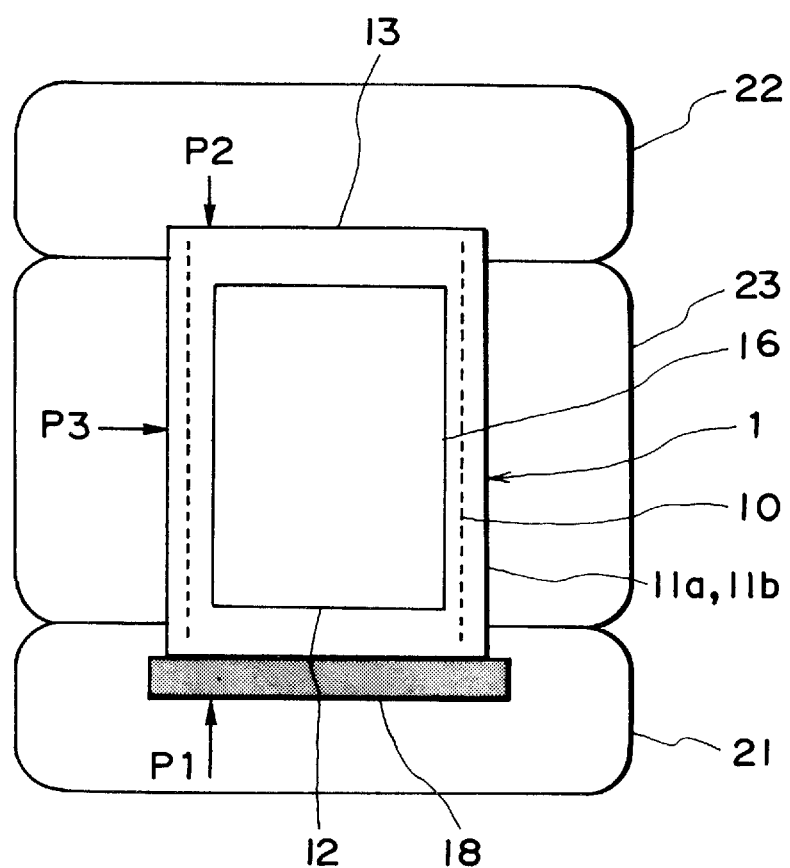
FIGS. 4 and 6–8 respectively illustrate a liquid crystal-filling step according to another embodiment.

In a system shown in FIG. 4, a first aperture region 12, an effective optical modulation region 16 and a second aperture region 13 of a (blank) cell 1 are held within sectored vessels 21, 23 and 22, respectively, in which the pressures can be independently controlled, so that the first aperture region 12, the effective optical modulation region 16 and the second aperture region 13 receives external pressures P1, P3 and P2, respectively, which can be independently set.

In general, the pressure P3 applied to the effective optical modulation region may preferably be set relative to the pressure P1 applied to the first aperture so as to satisfy $-1$ $kg.f/cm^2 \leq P1-P3 \leq 0.5$ $kg.f/cm^2$, particularly $-0.5$ $kg.f/cm^2 \leq P1-P3 \leq 0.3$ $kg.f/cm^2$, during the liquid crystal injection through the first aperture 12 to fill the cell 1.

The pressure P1 should exceed an atmospheric pressure. The upper limit is not particularly limited as far as the integrity of the cell is ensured. However, a pressure P1 in excess of 5 $kg.f/cm^2$ can result in an excessive dissolution of a pressurization gas into the liquid crystal, thus leading to bubbling in the later step, and should thus be obviated generally.

The pressure difference P1–P2 may preferably be in the range of 0.1–5.0 $kg.f/cm^2$, more preferably 0.3–2.5 $kg.f/cm^2$. Below 0.1 $kg.f/cm^2$, a long period can be required for the liquid crystal injection. In excess of 5.0 $kg.f/cm^2$, the pressure difference between the first aperture and second aperture is liable to be too large, thus being liable to cause a cell distortion or a cell gap distribution irregularity.

Under setting of appropriate pressure conditions as described above, the heating of the liquid crystal material for filling can be minimized or substantially omitted depending on a liquid crystal material used.

Of the above-mentioned pressure conditions, P1<P3 is preferred in order to provide a better uniformity of cell gap (i.e., effective spacing between a pair of substrates corresponding to a liquid crystal layer thickness between the substrates) as a major region including the effective optical modulation region of the cell receives the highest pressure so as to provide a better conformity of the cell gap to the size of spacer beads. On the other hand, P1>P3 is preferred in order to inject some excess of liquid crystal at liquid temperature into the cell, thereby alleviating the occurrence of a void due to a possible volumetric shrinkage of the liquid crystal after cooling to an operational temperature around room temperature depending on the liquid crystal material used.

As a preferred example, the second aperture region 13 of cell 1 is exposed out of the pressure vessel to provide a pressure condition of P1= (i.e., is nearly equal to) P3>P2 $\geq$ atmospheric pressure.

During the liquid crystal filling step, an amount of liquid crystal material, preferably at least 5%, more preferably 10% or more, further preferably 15% or more, of the cell volume, may be discharged out of the second aperture 13.

After the filling step, the pressures at the respective parts of the cell 1 are restored to the atmospheric pressure, the cell is cooled to room temperature, and an excessive liquid crystal attached to the first and second apertures is removed by wiping with a cloth or by washing with a solvent of, e.g., ketone-type, such as acetone or methyl ethyl ketone. Thereafter, the apertures are sealed with a sealing agent (e.g., epoxy resin) similar to the sealing agent 10.

Hereinbelow, the present invention will be described more specifically based on Examples.

EXAMPLE 1

A cell having a structure shown in FIGS. 1A and 1B was prepared and filled with a liquid crystal according to the manner illustrated in FIG. 2.

One major surface each of glass substrates 11a and 11b was coated with a 100 nm-thick transparent electrode 14a or 14b of ITO (indium tin oxide) by sputtering, which was then patterned into stripes by photolithography.

Then, the substrate 11a provided with the patterned transparent electrode 14a was coated with a film 15a of a polyimide having the following recurring unit structure by spin coating:

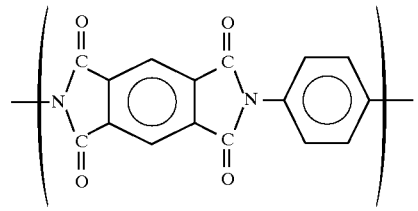

More specifically, the polyimide film 15a was formed by applying a 0.7 wt. % solution of its precursor in a solvent mixture of NMP/nBC (N-methylpyrrolidone/n-butyl cellosolve)=2/1 by spin coating at 2700 rpm, followed by pre-drying at 80° C. for 5 min. and hot baking at 200° C. for 1 hour. The resultant polyimide film 15a showed a thickness of 5 nm.

On the other hand, the substrate 11b provided with the patterned transparent electrode 14b was coated with an alignment control layer 15b of ODS-E (octadecylethoxysilane, available from Chisso K.K.) by applying a 0.5 wt. % solution of ODS-E in ethanol by spin coating at 2000 rpm, followed by pre-drying at 80 ° C. for 5 min. and hot-drying at 180° C. for 1 hour.

Then, the polyimide film 15a on the substrate 11a was rubbed with nylon cloth to effect a uniaxial aligning treatment, and the substrate 1a was dipped in a vessel filled with high-purity water and washed for 30 sec. under irradiation with ultrasonic wave, followed by blowing with nitrogen for scattering water droplets, drying at 60° C. in an oven for 30 min. Then, on the substrate 11a, silica beads (not shown) of 2.6 $\mu$m in diameter dispersed in ethanol were dispersed by spin coating at a density of ca. 300 beads/mm$^2$.

On the other hand, on the substrate 11b having the alignment control layer 15b, a sealing agent 10 of epoxy resin was applied in parallel stripes as shown in FIG. 1A by a dispenser and adhesive beads ("Toraypearl", diameter 5 $\mu$m; available from Toray K.K.) were dispersed at a density of 130 beads/mm$^2$.

Then, the thus treated substrates 11a and 11b were applied to each other so that their stripe electrodes intersect each other at right angles to form a (blank) cell having sizes of 300 mm×270 mm (including an effective optical modulation region of 270 mm×240 mm surrounded by a frame region having a width of 15 mm on each of the four sides) and having a first aperture 12 (injection port) and a second aperture 13 (effluent port).

Separately, a liquid crystal composition was prepared by mixing the following compounds in wt. ratios of A/B1/B2/B3/C=80/3/3/4/5. The resultant liquid crystal composition showed a spontaneous polarization At 25° C. of 26 nC/cm$^2$, a tilt angle of 27 deg., and exhibited a phase transition series on temperature decrease including isotropic (Iso.)-smectic A phase ($S_A$) transition temperature of 75° C., $S_A$-chiral smectic C phase ($S_C$) transition temperature of 45° C. and $S_C$-crystal phase transition temperature of 0° C.

A:

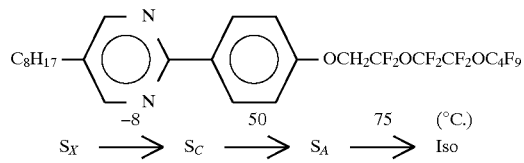

$S_X \xrightarrow{-8} S_C \xrightarrow{50} S_A \xrightarrow{75} Iso$ (°C.)

$B_1$:

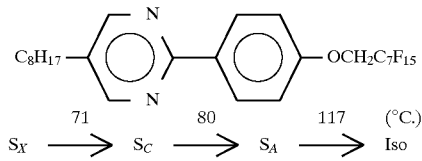

$S_X \xrightarrow{71} S_C \xrightarrow{80} S_A \xrightarrow{117} Iso$ (°C.)

$B_2$:

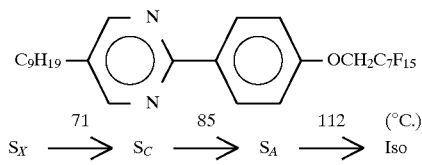

$S_X \xrightarrow{71} S_C \xrightarrow{85} S_A \xrightarrow{112} Iso$ (°C.)

$B_3$

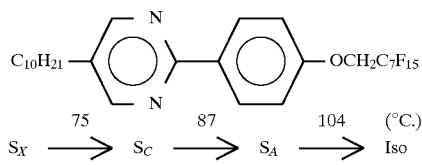

$S_X \xrightarrow{75} S_C \xrightarrow{87} S_A \xrightarrow{104} Iso$ (°C.)

C (chiral dopant)

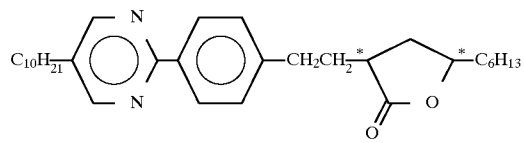

The liquid crystal composition was placed on a liquid crystal pan and once heated into liquid crystal phase (80° C.) to effect defoaming. The liquid crystal pan 18 containing the liquid crystal after the defoaming was placed within a pressure vessel 17 and the above-prepared blank cell 1 was inserted into the pressure vessel so that the first aperture 12 was dipped in the defoamed liquid crystal in the pan 18 and the portion thereof corresponding to the effective optical modulation region of the cell 1 was entirely housed within the pressure chamber 17 while exposing the second aperture region 13 outside the chamber 17. The top part of the cell 1 just below the second aperture region 13 was sealed peripherally by a silicone rubber packing disposed between the cell 1 and the inner wall of the chamber 17 so as to surround the cell 1.

The pressure vessel 17 incorporating the cell 1 was placed in a thermostat chamber (not shown) and heated to 90° C. so that the liquid crystal material in the liquid crystal pan 18 was transitioned to liquid (isotropic) phase. After confirmation of the phase transition, the pressure within the pressure vessel 17 was increased to 2 kg.f/cm² so as to provide a pressure at the first aperture (injection port) P1=an external pressure at the effective optical modulation region P3=2 kg.f/cm² and a pressure at the second aperture (effluent port) P2=1 kg.f/cm². Under the condition, the liquid crystal was injected into the cell 1 through the first aperture 12. Four hours thereafter, the pressure within the vessel 17 was restored to 1 kg.f/cm² within 2 min. and the temperature was lowered at a rate of 1° C./min. to room temperature. During the injection, ca. 30 mm³ of the liquid crystal flowed out of the effluent port 13, and that corresponded to ca. 14% of the cell inner volume. After the cell 1 was taken out of the vessel 17, the liquid crystal material attached to the first and second apertures was wiped out, and the first and second apertures were sealed with a two-liquid type epoxy resin sealing agent ("STRUCTBOND EW-460NF", available from Mitsui Toatsu Kagaku K.K.; a mixture of a principal agent/a hardener=2/0.84 (by weight)) applied by means of a dispenser to form a liquid crystal cell. The resultant liquid crystal cell exhibited a good filling state free from any unfilled region, and was free from a difference in alignment state between a region close to the injection port (first aperture) and a region close to the effluent port (second aperture).

Then, 5×5 points were selected at equal spacings along the respective sides within the effective optical modulation region of the cell, the retardation was measured at the respective points by using a retardation meter ("RA-100", available from Olympus K.K.) to measure the cell gap at each point for evaluation of a distribution thereof. As a result, the cell gap distribution within the effective optical modulation region was 2.6±0.05 μm, thus showing a uniform value over the planar extension.

Figure 11:
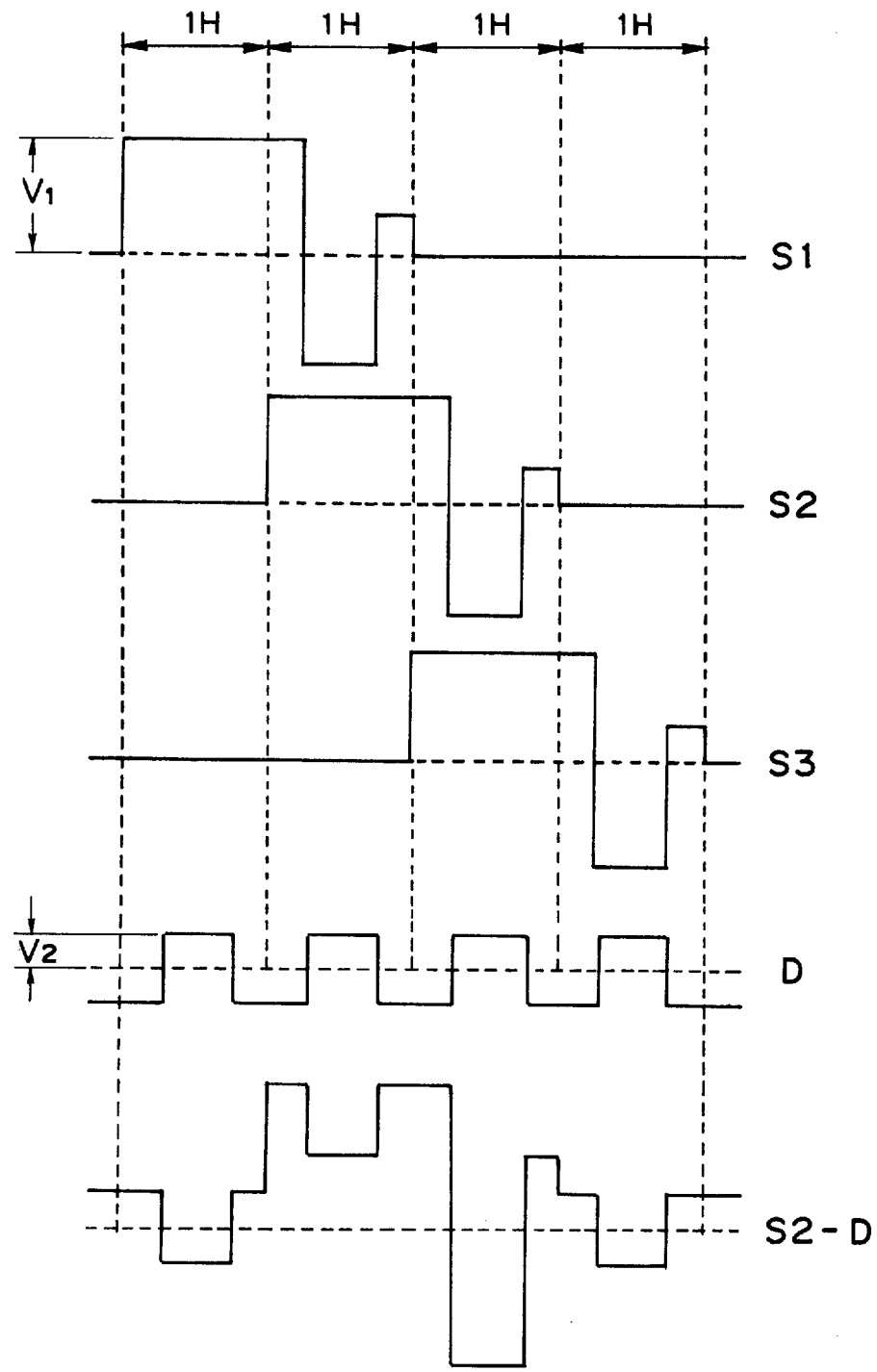
FIG. 11 is a waveform diagram showing a set of drive signals used for evaluating a switching threshold distribution over an effective optical modulation region of liquid crystal cells prepared in Examples.

Further, the threshold distribution over the device (cell) was evaluated by applying a set of driving waveforms as shown in FIG. 11 (Vop (=V1+V2) =15 volts and a bias ratio (=V2/Vop)=⅓) for once placing the pixels on a scanning line in a dark state and for inversion into a bright state while gradually increasing the unit pulse period 1H, so as to evaluate the occurrence of a local difference in time (1H) for inversion into the bright state. As a result, no appreciable difference was observed over the entire effective optical modulation region.

EXAMPLE 2

Figure 5:
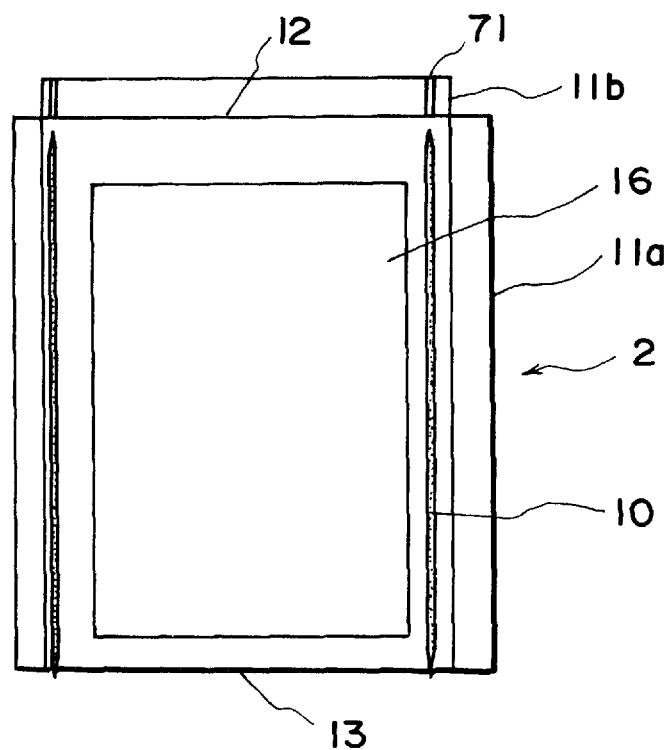
FIG. 5 is a plan view of another example of cell structure prepared according to a process of the invention.

A (blank) cell 2 having a structure as shown in FIG. 5 was prepared. The cell 2 had a structure which was generally similar to that of the cell 1 of Example 1, but one substrate 11b thereof had a projecting edge portion at its injection port 12 side out of the opposite substrate 11a. Further, at portions on the projecting edge of the substrate 11b corresponding to extension of stripes 10 of sealing agent, banks or projection lines 71 of UV-curable resin were applied.

Figure 6:
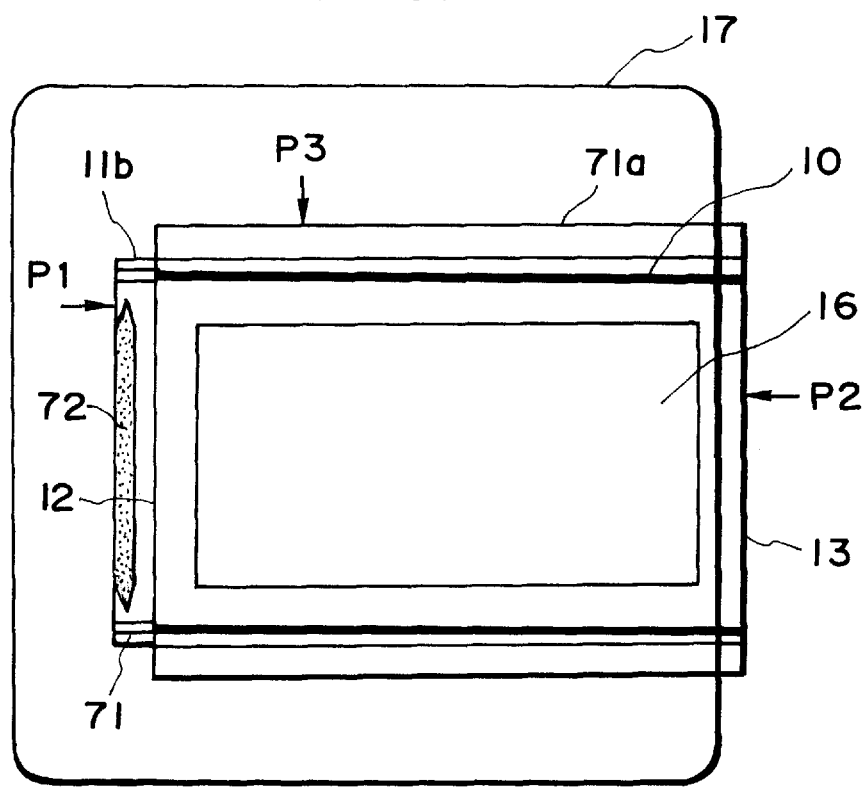

Then, the same liquid crystal composition as used in Example 1 was dripped to place an amount of the liquid crystal 72 in a region defined by the banks 72 on the first aperture 12 side on the substrate 11b of the cell 2, and the cell 2 was disposed within a pressure vessel 17 so that the first aperture 12 and the effective optical modulation region 16 were housed within the vessel 17 as shown in FIG. 6. The cell 2 was inclined so that the liquid crystal 12 stopped the first aperture 12 by placing the first aperture 12 at a higher position than the second aperture 13. The circumference of the cell 2 adjacent to the second aperture 13 was sealed by a silicone rubber packing.

The pressure vessel 17 housing the cell 2 was placed in a thermostat chamber (not shown) and heated so that the liquid crystal material 72 at the first aperture region 12 was transition to liquid phase. Thereafter, the pressure within the pressure vessel 17 was increased to 2 kg.f/cm² so as to provide a pressure at the first aperture P1= an external pressure at the effective optical modulation region P3 =2 kg.f/cm², and a pressure at the second aperture P2 =1 kg.f/cm², thereby injecting the liquid crystal 72 into the cell 2 through the first aperture 12. Four hours thereafter, the pressure within the vessel 17 was restored to 1 kg.f/cm² within 2 min. and the temperature was lowered at a rate of 1° C./min. to room temperature. During the injection, ca. 35 mm³ of the liquid crystal flowed out of the effluent port 13, and that corresponded to ca. 17% of the cell inner volume. After the cell 2 was taken out of the vessel 17, the liquid crystal material attached to the first and second apertures was wiped out, and the first and second apertures were sealed with a two-liquid type epoxy resin sealing agent similarly as in Example 1 to form a liquid crystal cell. The resultant liquid crystal cell exhibited a good filling state free from any unfilled region, and was free from a difference in alignment state between a region close to the injection port (first aperture) and a region close to the effluent port (second aperture). As a result of evaluation in the same manner as in Example 1, the liquid crystal cell exhibited a substantially uniform cell gap distribution of 2.6±0.05 μm and no irregularity in threshold distribution over the entire effective optical modulation region.

EXAMPLE 3

A (blank) cell having a structure as shown in FIG. 5 was also prepared in a similar manner as in Example 2 but, instead of the surfactant layer 15b formed in Example 2 (also in Example 1), a polyimide film similar to the polyimide film 15a was formed.

More specifically, one major surface each of glass substrates 11a and 11b was coated with a 100 nm-thick transparent electrode 14a or 14b of ITO (indium tin oxide) by sputtering, which was then patterned into stripes by photolithography. Then, each substrate was coated with a 5 nm-thick polyimide film formed by applying a 0.7 wt. % solution of a polyimide precursor ("LP64" available from Toray K.K.) in a mixture solvent of NMP/nBC=2/1 by spin coating at 2700 rpm, followed by pre-drying at 80° C. for 5 min. and hot-baking at 200° C. for 1 hour.

Then, the polyimide films on the substrates were rubbed with nylon cloth to effect a uniaxial aligning treatment, and the substrates were dipped in a vessel filled with high-purity water and washed for 30 sec. under irradiation with ultrasonic wave, followed by blowing with nitrogen for scattering water droplets, drying at 60° C. in an oven for 30 min. Then, on one of the substrates, silica beads of 6 μm in diameter dispersed in ethanol were dispersed by spin coating at a density of ca. 300 beads/mm².

On the other substrate, a sealing agent 10 of epoxy resin was applied in parallel stripes as shown in FIG. 1A by a dispenser.

Then, the thus treated two substrates were applied to each other so that their stripe electrodes intersect each other at right angles and the rubbing directions form an angle of nearly 90 deg. to form a (blank) cell having sizes of 300 mm×270 mm (including an effective optical modulation region of 270 mm×240 mm surrounded by a frame region having a width of 15 mm on each of the four sides) and having a first aperture 12 (injection port) and a second aperture 13 (effluent port).

Similarly as in Example 2, at portions on the projecting edge of the substrate 11b corresponding to extension of stripes 10 of sealing agent, banks or projecting lines 71 of UV-curable resin were applied (FIG. 5).

Then, a liquid crystal ("E7", available from BDH Co.) after defoaming was dripped to place an amount of the liquid crystal 72 in a region defined by the banks 72 on the first aperture 12 side on the substrate 11b of the cell 2, and the cell 2 was disposed within a pressure vessel 17 so that the first aperture 12 and the effective optical modulation region 16 were housed within the vessel 17 as shown in FIG. 6. The cell 2 was inclined so that the liquid crystal 12 stopped the first aperture 12 by placing the first aperture 12 at a higher position than the second aperture 13. The circumference of the cell 2 adjacent to the second aperture 13 was sealed by a silicone rubber packing.

The pressure vessel 17 housing the cell 2 was placed in a thermostat chamber (not shown) and then, at room temperature, the pressure within the pressure vessel 17 was increased to 2 kg.f/cm² so as to provide a pressure at the first aperture P1= an external pressure at the effective optical modulation region P3=2 kg.f/cm², and a pressure at the second aperture P2=1 kg.f/cm², thereby injecting the liquid crystal 72 into the cell 2 through the first aperture 12. Seven hours thereafter, the pressure within the vessel 17 was restored to 1 kg.f/cm². During the injection, ca. 30 mm³ of the liquid crystal flowed out of the effluent port 13, and that corresponded to ca. 6% of the cell inner volume. After the cell 2 was taken out of the vessel 17, the liquid crystal material attached to the first and second apertures was wiped out, and the first and second apertures were sealed with a two-liquid type epoxy resin sealing agent similarly as in Example 1 to form a liquid crystal cell. The resultant liquid crystal cell exhibited a good filling state free from any unfilled region, and was free from a difference in alignment state between a region close to the injection port (first aperture) and a region closer to the effluent port (second aperture). As a result of evaluation in the same manner as in Example 1, the liquid crystal cell exhibited a substantially uniform cell gap distribution of 6±0.1 μm.

EXAMPLE 4

Figure 7:
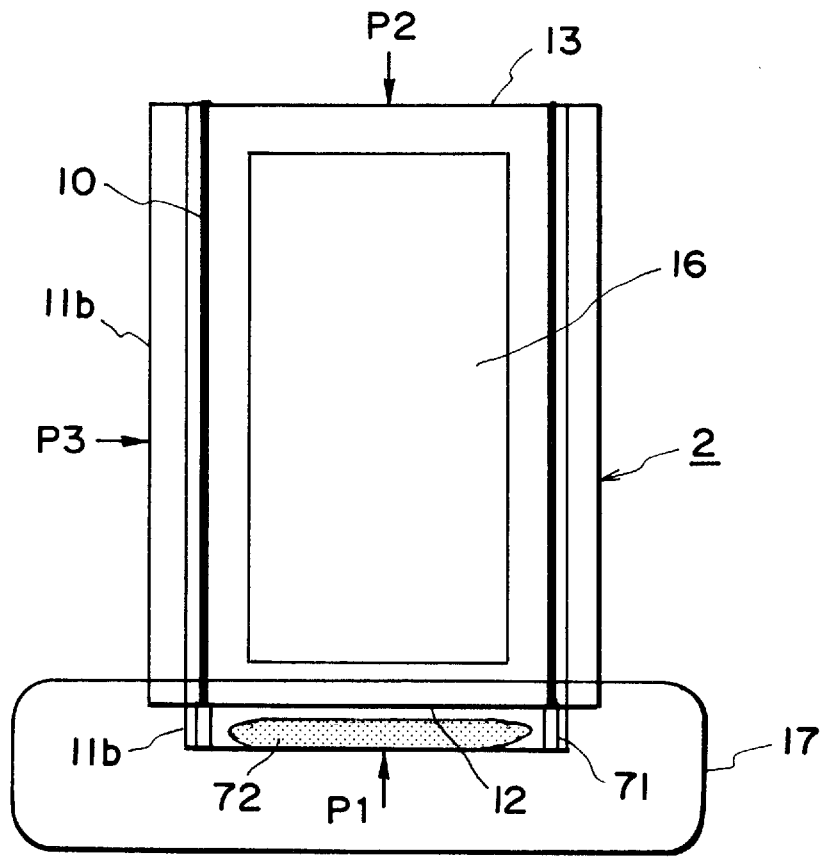

A (blank) cell 2 having a structure as shown in FIG. 5 was also prepared in a similar manner as in Example 2. The resultant cell 2 was, however, subjected to a liquid crystal filling step in a system as shown in FIG. 7. More specifically, in this Example 4, the cell 2 carrying an amount of liquid crystal 72 on its first aperture region 12 was set so that only its first aperture region 12 was housed within a pressure vessel 71, the cell 2 and the pressure vessel 17 was placed in a thermostat chamber (not shown), and the liquid crystal 72 was heated to a temperature causing a transition to liquid phase. After the transition, the pressure within the vessel 17 was raised to 1.2 kg.f/cm² so as to provide a pressure at the first aperture P1=1.2 kg.f/cm² and an external pressure at the effective optical modulation region P3= a pressure at the second aperture P2=1.0 kg.f/cm². Under the condition, the liquid crystal was injected into the cell 2 through the first aperture 1. Twenty hours thereafter, the pressure within the vessel 17 was restored to 1 kg.f/cm within 2 min. and the temperature was lowered at a rate of 1° C./min. to room temperature. During the injection, ca. 40 mm³ of the liquid crystal flowed out of the effluent port 13, and that corresponded to ca. 19% of the cell inner volume. The cell 2 was taken out of the vessel 17 and sealed to form a liquid crystal cell. The resultant liquid crystal cell exhibited a good filling state free from any unfilled region, was free from a difference in alignment state between a region close to the injection port (first aperture) and a region close to the effluent port (second aperture) and exhibited a uniform threshold characteristic over the planar cell extension similarly as in Example 1.

Reference Example 1

Figure 8:
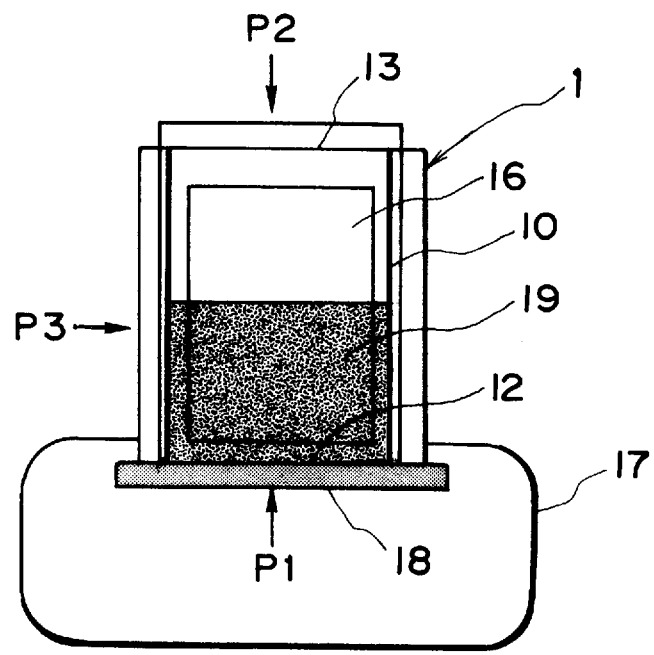

A (blank) cell 1 having a structure as shown in FIG. 1 was prepared similarly as in Example 1, and the first aperture region 12 thereof was dipped within the same defoamed liquid crystal material as in Example 1 carried on a liquid crystal pan 18. The cell 1 and the liquid crystal pan was set so that only the first aperture region 12 was housed and sealed up by a silicon rubber packing within the pressure vessel 17 as shown in FIG. 8.

The pressure chamber 17 together with the set cell 1 was placed within a thermostat chamber (not shown), and heated to a temperature where the liquid crystal on the pan 18 became liquid phase. After the phase transition, the pressure within the pressure chamber 17 was raised to 2.0 kg.f/cm$^2$ so as to provide a pressure at the first aperture P1=2.0 kg.f/cm$^2$, and a pressure at the effective optical modulation region P3=a pressure at the second aperture P2=1.0 kg.f/cm$^2$. After 6 hours of liquid crystal injection under the conditions, the temperature was restored to room temperature to complete a liquid crystal cell.

As a result of cell gap distribution measurement over the effective optical modulation region in the same manner as in Example 1, the liquid crystal cell showed a cell gap of 3.0 μm at the central portion and a cell gap of ca. 2.6 μm at a point close to the second aperture (effluent port) region, thus showing a somewhat inferior gap uniformity over the cell extension in some cases.

Reference Example 2

Figure 9:
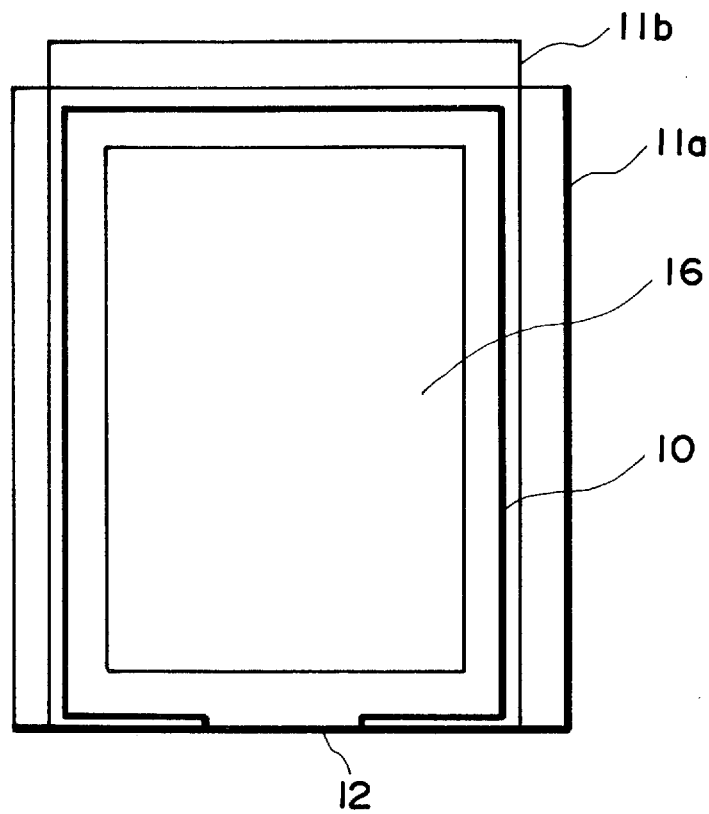
FIGS. 9 and 10 are plan views showing a cell structure prepared according to a reference example and a state of liquid crystal injection in the cell, respectively.
Figure 10:
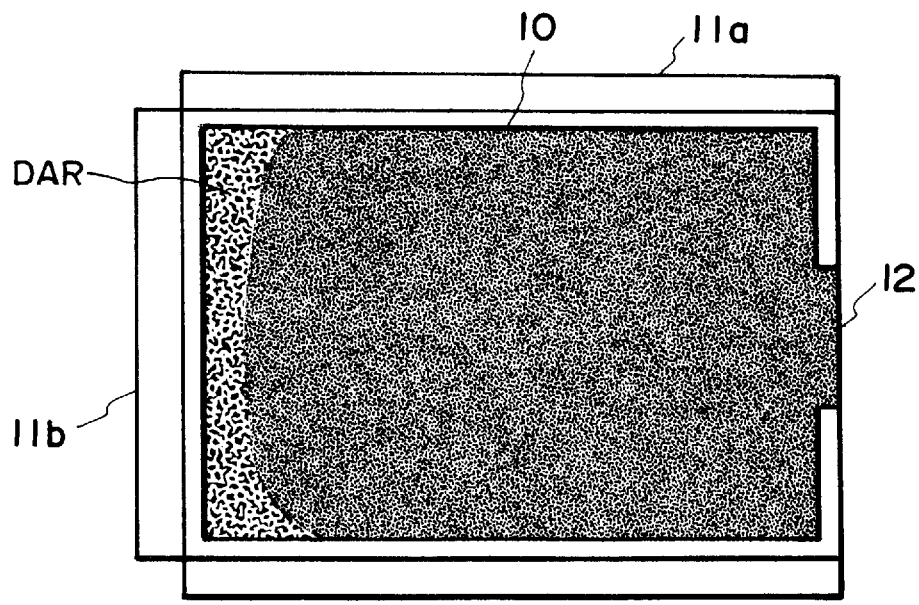

A (blank) cell having a sectional structure as shown in FIG. 1B but a planar structure as shown in FIG. 9 was prepared in a similar manner as in Example 1. Thus, in this Example, a sealing agent 10 was applied in a pattern as shown in FIG. 9 to provide a 230 mm-wide aperture 12 (injection port) but no aperture for an effluent port.

The cell was filled with the same liquid crystal material as in Example 1 according to a vacuum injection process. More specifically, before liquid crystal injection, the cell was heated at 100° C. and subjected to a vacuum of 10$^{-6}$ torr within a vacuum chamber for 24 hours. Then, N$_2$ was leaked into the vacuum chamber to provide a vacuum of 10$^{-2}$ torr. In the vacuum chamber, the injection port 12 of the cell was dipped in the liquid crystal material once defoamed at 80° C. and heated at 80° C. Thereafter, the pressure within the vacuum chamber was restored to an atmospheric pressure for effecting the liquid crystal injection. After 10 hours, the temperature was restored to room temperature, the cell was taken out and sealed to complete a liquid crystal cell. As a result of observation of an alignment state, the cell exhibited a region DAR with a different alignment state along the sealing 10 on a side opposite the injection port 12. The region DAR exhibited a threshold which was 1.5 to 2.0 times that in the other region and occupied ca. 10% of the entire cell inner region.

Reference Example 3

A (blank) cell 1 was prepared in the same manner as in Example 1, and the first aperture 12 thereof was dipped within the same defoamed liquid crystal material as used in Example 1 on a liquid crystal pan. The cell 1 and the liquid crystal pan 18 were set within a pressure vessel 17 so that the cell 1 except for its second aperture region 13 was housed and sealed up with a silicone rubber packing within the pressure vessel 17 as shown in FIG. 2 (i.e., in the same manner as in Example 1).

Thereafter, at room temperature where the liquid crystal assumed chiral smectic phase, the pressure within the pressure chamber 17 was raised to 2 kg.f/cm$^2$ so as to provide a pressure at the first aperture P1= a pressure at the effective optical modulation region P3=2 kg.f/cm$^2$ and a pressure at the second aperture P2=1 kg.f/cm$^2$. After 4 hours, the pressure within the vessel 17 was restored to 1 kg.f/cm$^2$, and the liquid crystal injection state within the cell was observed, whereby substantial injection had not been performed.

Examples 5–11, Reference Examples 4–7

Blank cells 1 having a planar structure as shown in FIG. 1A and a sectional structure as shown in FIG. 1B were prepared in a similar manner as in Example 1.

Then, the first aperture region 12 of each cell was dipped within the same defoamed liquid crystal material as in Example 1 on a liquid crystal pan 18, and the cell was set in independently pressure-controllable pressure vessels 21–23, so that the first aperture region 12 was held within the vessel 21, the effective optical modulation region 16 was held within the vessel 23 and the second aperture region 13 was held within the vessel 22 while isolating the respective vessels by silicone rubber packings disposed to surround the cell periphery. The combination of the vessels holding the cell together with the assemble member was held within a thermostat chamber (not shown) at a temperature where the liquid crystal assumed liquid phase.

Then, the respective pressure vessels 21–23 were held at pressures P1, P2 and P3 for the respective cells as shown in the following Table 1 to effect liquid crystal injection through the first apertures. After four hours within which amounts of liquid crystals were discharged out of the second aperture for the respective cells as shown in Table 1 below, the temperature was restored to room temperature, and then the pressure in the respective pressure vessels 21–23 was restored to 1 kg.f/cm$^2$ to complete the liquid crystal filling.

Each cell was subjected to the observation of the filling state and the cell gap distribution measurement over the effective optical modulation region in the same manner as in Example 1.

The evaluation results of the filling state of the respective liquid crystal cells thus obtained are also shown in the following Table 1.

TABLE 1

|  | Pressures (kg · f/cm$^2$) | | | Approx. discharged | Filling* |
| --- | --- | --- | --- | --- | --- |
|  | P1 | P3 | P2 | mm$^3$ (%) | state |
| Ref. Ex. 4 | 2.0 | 1.0 | 1.0 | 46 (22) | C2 |
| Ref. Ex. 5 | 2.0 | 1.3 | 1.0 | 43 (20) | C2 |
| Ex. 5 | 2.0 | 1.5 | 1.0 | 37 (18) | B |
| Ex. 6 | 2.0 | 1.7 | 1.0 | 35 (17) | A |
| Ex. 7 | 2.0 | 2.0 | 1.0 | 30 (14) | A |
| Ex. 8 | 2.0 | 2.5 | 1.0 | 28 (13) | A |
| Ex. 9 | 2.0 | 3.0 | 1.0 | 25 (12) | B |
| Ref. Ex. 6 | 2.0 | 3.5 | 1.0 | 22 (10) | C1 |
| Ref. Ex. 7 | 2.0 | 4.0 | 1.0 | 17 (18) | C1 |
| Ex. 10 | 3.0 | 3.0 | 2.0 | 31 (15) | A |
| Ex. 11 | 3.0 | 3.0 | 1.0 | 45 (21) | A |

*Filling state in the above Table 1 was evaluated according to the following standard:

A: In the effective optical modulation region, no unfilled region was present at all and the difference between the maximum and minimum cell gaps was at most 0.2 μm.

B: In the effective optical modulation region, no unfilled region was present at all and the difference between the maximum and minimum cell gaps was larger than 0.2 μm but at most 0.4 μm.

C1: In the effective optical modulation region, an unfilled region was observed.

C2: In the effective optical modulation region, the difference between the maximum and minimum cell gaps exceeded 0.4 μm.

The results shown in Table 1 teach that, in the case of liquid crystal filling into a cell under the presence of a difference in pressure between the injection port (pressure P1) and the effluent port (pressure P2), it is preferred to set a pressure P3 at the effective optical modulation region so as to satisfy $-1$ kg.f/cm$^2$ $\leq$ P1$-$P3 $\leq$ 0.5 kg.f/cm$^2$ so as to accomplish an effective filling of the cell with liquid crystal.

What is claimed is:

1. A process for producing a liquid crystal device, comprising the steps of:
    a) disposing a pair or substrates opposite to each other so as to form a cell between the substrates while leaving a first aperture and a second aperture for communication with an exterior and forming an effective optical modulation region between the first and second apertures,
    b) heating a liquid crystal material for filling the cell, and
    c) filling the cell with the liquid crystal material by injecting the liquid crystal material through the first aperture under a pressure difference held between the first and second apertures and, after a prescribed period, allowing the liquid crystal material to be discharged out of the second aperture;
    wherein the liquid crystal material is discharged out of the second aperture in an amount of at least 5% of an inner volume of the cell.

2. A process according to claim 1, wherein the liquid crystal material is heated to its liquid phase in the step b).

3. A process according to claim 1, wherein said liquid crystal material is a liquid crystal composition containing at least one compound having a smectic phase or a latent smectic phase.

4. A process according to claim 1, wherein said liquid crystal material assumes chiral smectic phase.

5. A process according to claim 1, wherein said liquid crystal material is a liquid crystal composition containing at least one species of fluorine-containing mesomorphic compound which has a structure including a fluorocarbon terminal portion and a hydrocarbon terminal portion connected by a central core and has a smectic phase or a latent smectic phase.

6. A process according to claim 1, wherein external pressures applied to the first aperture, the effective optical modulation region and the second aperture of the cell are independently controlled in the step c).

7. A process according to claim 1, wherein, in the step c), the first aperture, the second aperture and the effective optical modulation region of the cell receive external pressures P1, P2 and P3, respectively, satisfying P1>P2 and $-1$ kg.f/cm$^2$ $\leq$ P1$-$P3 $\leq$ 0.5 kg.f/cm$^2$.

8. A process according to claim 1, wherein, in the step c), the first aperture, the second aperture and the effective optical modulation region of the cell receive external pressures P1, P2 and P3, respectively, satisfying P1>P2 and $-0.5$ kg.f/cm$^2$ $\leq$ P1$-$P3 $\leq$ 0.3 kg.f/cm$^2$.

9. A process according to claim 1, further including steps of restoring an external pressure applied to the cell uniformly to an atmospheric pressure and then cooling the cell filled with the liquid crystal, after the step c).

10. A process according to claim 1, wherein the liquid crystal material is discharged out of the second aperture in an amount of at least 10% of an inner volume of the cell.

11. A process according to claim 1, wherein the cell is generally in a shape of a rectangle and have the first and second apertures on opposite sides of the rectangle.

12. A process according to claim 1, wherein the cell is generally in a shape of a rectangle and at least one of the first and second apertures has a length substantially extending over an entire length of one side of the rectangle.

13. A process for producing a liquid crystal device, comprising the steps of:
    a) disposing a pair of substrates opposite to each other so as to form a cell between the substrates while leaving a first aperture and a second aperture for communication with an exterior and forming an effective optical modulation region between the first and second apertures, and
    b) filling the cell with the liquid crystal material by injecting the liquid crystal material through the first aperture under a pressure difference held between the first and second apertures and, after a prescribed period, allowing the liquid crystal material to be discharged out of the second aperture, wherein the first aperture, the second aperture and the effective optical modulation region of the cell receive external pressures P1, P2 and P3, respectively, satisfying P1>P2 and $-1$ kg.f/cm$^2$ $\leq$ P1$-$P3 $\leq$ 0.5 kg.f/cm$^2$.

* * * * *

UNITED STATES PATENT AND TRADEMARK OFFICE
CERTIFICATE OF CORRECTION

PATENT NO. : 5,835,181

DATED : November 10, 1998

INVENTOR(S) : KATSUTOSHI NAKAMURA ET AL.      Page 1 of 3

It is certified that error appears in the above-identified patent and that said Letters Patent is hereby corrected as shown below:

[56] FOREIGN PATENT DOCUMENTS

"2142753" should read --2-142753--;

COLUMN 1

Line 36, "ga" should read --a--;

COLUMN 3

Line 12, "surround" should read --surrounded--;
Line 25, "most" should read --major--;
Line 27, "ia" should read --a--;

COLUMN 5

Line 10, "receives" should read --receive--;
Line 52, "P1=" should read --P1≈--;
Line 60, "an" should read --any--;

UNITED STATES PATENT AND TRADEMARK OFFICE
CERTIFICATE OF CORRECTION

PATENT NO. : 5,835,181

DATED : November 10, 1998

INVENTOR(S) : KATSUTOSHI NAKAMURA ET AL.          Page 2 of 3

It is certified that error appears in the above-identified patent and that said Letters Patent is hereby corrected as shown below:

COLUMN 6

Line 39, "substrate 1a" should read --substrate 11a--;
    Line 64, "At" should read --at--;

COLUMN 8

Line 58, "crystal 12" should read --crystal--;
    Line 66, "was" should read --made the--;

COLUMN 10

Line 3, "banks 72" should read --banks 71--;

COLUMN 11

Line 20, Close up right margin;
    Line 21, Close up left margin;
    Line 31, "cell" should read --cell 1--;

UNITED STATES PATENT AND TRADEMARK OFFICE
CERTIFICATE OF CORRECTION

PATENT NO. : 5,835,181

DATED : November 10, 1998

INVENTOR(S): KATSUTOSHI NAKAMURA ET AL.

It is certified that error appears in the above-identified patent and that said Letters Patent is hereby corrected as shown below:

<u>COLUMN 12</u>

Line 3, "chamber 17" should read --vessel 17--.

<u>COLUMN 14</u>

Line 24, "have" should read --has--.

Signed and Sealed this

Seventeenth Day of August, 1999

Attest:

Q. TODD DICKINSON

*Attesting Officer*     *Acting Commissioner of Patents and Trademarks*